United States Patent
Kim

(10) Patent No.: US 10,715,842 B2
(45) Date of Patent: Jul. 14, 2020

(54) METHOD AND SYSTEM FOR DISTRIBUTING INTERNET CARTOON CONTENT, AND RECORDING MEDIUM

(71) Applicant: NAVER WEBTOON CORPORATION, Seongnam-si (KR)

(72) Inventor: Hyungil Kim, Seongnam-si (KR)

(73) Assignee: NAVER WEBTOON CORPORATION, Seongnam-si (KR)

( * ) Notice: Subject to any disclaimer, the term of this patent is extended or adjusted under 35 U.S.C. 154(b) by 224 days.

(21) Appl. No.: 15/668,341

(22) Filed: Aug. 3, 2017

(65) Prior Publication Data

US 2017/0332110 A1    Nov. 16, 2017

Related U.S. Application Data

(63) Continuation of application No. PCT/KR2015/012536, filed on Nov. 20, 2015.

(30) Foreign Application Priority Data

Feb. 3, 2015   (KR) .................. 10-2015-0016662

(51) Int. Cl.
*H04N 21/235*   (2011.01)
*G06F 16/44*    (2019.01)
(Continued)

(52) U.S. Cl.
CPC ......... *H04N 21/2353* (2013.01); *G06F 16/44* (2019.01); *G06F 16/54* (2019.01);
(Continued)

(58) Field of Classification Search
CPC .. H04N 21/2353; H04N 21/266; H04N 21/84; H04N 21/816; H04N 21/2747; G06F 16/44; G06F 16/958; G06F 16/54
(Continued)

(56) References Cited

U.S. PATENT DOCUMENTS

| | | | | |
|---|---|---|---|---|
| 2009/0190804 | A1* | 7/2009 | Yokoi | G11B 27/28 382/118 |
| 2011/0249861 | A1* | 10/2011 | Tokutake | G11B 27/105 382/103 |

(Continued)

FOREIGN PATENT DOCUMENTS

| | | |
|---|---|---|
| JP | 2012133663 A | 7/2012 |
| JP | 2013077982 A | 4/2013 |

(Continued)

OTHER PUBLICATIONS

Int'l. Search Report issued in Int'l. Application No. PCT/KR2015/012536, dated Feb. 29, 2016.
(Continued)

*Primary Examiner* — Tu T Nguyen
(74) *Attorney, Agent, or Firm* — Greer Burns & Crain Ltd.

(57) ABSTRACT

A method and a system for distributing Internet cartoon content, and a recording medium are disclosed. The content distribution method comprises the steps of: registering a high-definition original image for at least one unit scene of all the unit scenes of the cartoon content; and capturing the high-definition original image of the unit scene selected by a user from the cartoon content.

18 Claims, 14 Drawing Sheets

(51) Int. Cl.
*H04N 21/81* (2011.01)
*H04N 21/2747* (2011.01)
*G06F 16/958* (2019.01)
*G06F 16/54* (2019.01)
*H04N 21/266* (2011.01)
*H04N 21/84* (2011.01)

(52) U.S. Cl.
CPC ......... *G06F 16/958* (2019.01); *H04N 21/266* (2013.01); *H04N 21/2747* (2013.01); *H04N 21/816* (2013.01); *H04N 21/84* (2013.01)

(58) Field of Classification Search
USPC ..................................................... 709/219
See application file for complete search history.

(56) References Cited

U.S. PATENT DOCUMENTS

| | | | |
|---|---|---|---|
| 2012/0229629 A1* | 9/2012 | Blumstein-Koren | ........................ G06F 16/7837 348/143 |
| 2015/0040011 A1* | 2/2015 | Chun | ................... H04N 21/252 715/723 |
| 2016/0210998 A1* | 7/2016 | Leske | .................... G06T 11/60 |

FOREIGN PATENT DOCUMENTS

| | | |
|---|---|---|
| JP | 2014056404 A | 3/2014 |
| JP | 2014182658 A | 9/2014 |
| KR | 10-2007-0048919 | 5/2007 |
| KR | 10-2010-0135131 | 12/2010 |
| KR | 10-2011-0026361 | 3/2011 |
| KR | 10-2011-0073853 | 6/2011 |
| KR | 10-2014-0116656 | 10/2014 |

OTHER PUBLICATIONS

Japanese Office Action dated Aug. 28, 2018 by the Japanese Patent Office corresponding to Japanese patent application No. 2017-540248.
Net support • Downloads • Movies • Music • Graphics etc . . . Smoothly! happily! Get it! Free software is the largest ever! It's really great! Free software 960 series, Adult Windows version 41, Japan, Inforex Publishing Co., Ltd., May 1, 2013, p. 24 (Note) Some or all of the presented not-patent literature may not be sent due to restrictions such as laws or contracts (with partial translation).

* cited by examiner

METHOD AND SYSTEM FOR DISTRIBUTING INTERNET CARTOON CONTENT, AND RECORDING MEDIUM

CROSS-REFERENCE TO RELATED APPLICATIONS

This is a continuation application of International Application No. PCT/KR2015/012536, filed Nov. 20, 2015, which claims benefit of Korean Patent Application No. 10-2015-0016662, filed Feb. 3, 2015.

BACKGROUND OF THE INVENTION

Field of Invention

Example embodiments relate to technology for readily distributing cartoon content.

Description of Related Art

In general, a cartoon refers to a simple drawing that shows features of a person, an animal, a thing, etc., in a humorously exaggerated way, and provides a reading by including a short text and by containing a humor, a satire, or a predetermined plot.

In the recent times, online cartoons have been released and many users obtain fun and information by reading such cartoons. An online cartoon providing system allows a user to read a cartoon according to a member-based authentication result. Approved users may further easily view a cartoon by selecting the cartoon and by selecting an automatic page turning function or a passive page turning function.

For example, Korean Patent Publication No. 10-2011-0123393, published on Nov. 15, 2011, discloses technology for providing a cartoon in a form of mobile digital content through online direct deals.

BRIEF SUMMARY OF THE INVENTION

One or more example embodiments provide a method and system that may capture a partial image of cartoon content at a high definition, and a recording medium.

One or more example embodiments also provide a method and system that may select and distribute a partial image of cartoon content, and a recording medium.

One or more example embodiments also provide a method and system that may readily edit and share lines of cartoon content, and a recording medium.

According to an aspect of at least one example embodiment, there is provided a content distribution method implemented in a computer, the method including registering a high-definition original image for at least one unit scene among all the unit scenes of cartoon content; and capturing a high-definition original image of a unit scene selected by a user from the cartoon content.

According to an aspect of at least one example embodiment, there is provided a non-transitory computer-readable medium storing an instruction to cause a computer system to control distribution of cartoon content. The instruction controls the computer system to perform functions including registering a high-definition original image for at least one unit scene among all the unit scenes of the cartoon content; and capturing a high-definition original image of a unit scene selected by a user from the cartoon content.

According to an aspect of at least one example embodiment, there is provided a content distribution system including a register configured to register a high-definition original image for at least one unit scene among all the unit scenes of cartoon content; and a provider configured to provide a capturing function for a high-definition original image of a unit scene selected by a user from the cartoon content.

According to some example embodiments, since a high-definition original image is constructed in a database with respect to cartoon content and a partial image of the cartoon content is provided at a high definition, a user may capture a required image at the high definition and may own or share the captured high-definition image.

According to some example embodiments, it is possible to readily distribute only a portion desired by a user, instead of distributing an entire episode or an entire page of cartoon content, by selecting and distributing a partial image from the cartoon content.

According to some example embodiments, it is possible to further readily create and distribute content by providing an environment capable of creating the best collection using a partial image of cartoon content or by changing and sharing a line area of the cartoon content.

DETAILED DESCRIPTION OF THE INVENTION

Hereinafter, example embodiments are described with reference to the accompanying drawings.

The example embodiments relate to technology for readily distributing cartoon content, and may be applicable to a service field, for example, a webtoon service, etc., for providing a digital content cartoon (hereinafter, referred to as a webtoon) through the Internet based on a wired/wireless network.

Figure 1:
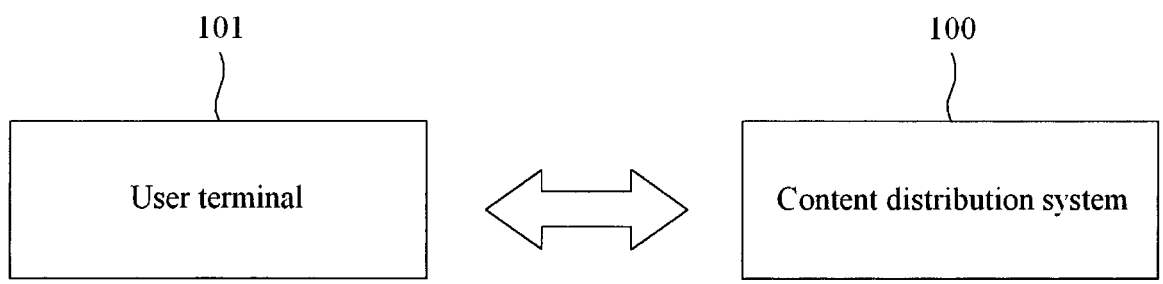
FIG. 1 is a diagram illustrating a relationship between a user terminal and a content distribution system according to at least one example embodiment.

FIG. 1 is a diagram illustrating a relationship between a user terminal and a content distribution system according to at least one example embodiment. FIG. 1 illustrates a content distribution system 100 and a user terminal 101. In FIG. 1, an indicator with arrowheads may indicate that data may be transmitted and received between the content distribution system 100 and the user terminal 101 over a network.

The user terminal 101 may be, for example, a personal computer (PC), a laptop computer, a smartphone, a tablet, a wearable computer, and the like, and may indicate any type of mobile devices capable of connecting to a website/mobile site associated with the content distribution system 100, and installing and executing a service exclusive application. Here, the user terminal 101 may perform an overall service operation, such as a service screen configuration, a data input, a data transmission and reception, a data storage, and the like, under control of the website/mobile site or the exclusive application.

The content distribution system 100 serves as a service platform to provide a webtoon to the user terminal 101 corresponding to a client. In particular, the content distribution system 100 may provide a user using a webtoon service with an environment in which the user may readily capture and share a desired partial image in a webtoon. Here, the content distribution system 100 may be configured as an application form on the user terminal 101. It is provided as an example only and the content distribution system 100 may be configured to be included in a service platform that provides a webtoon service in a client-server environment.

Figure 2:
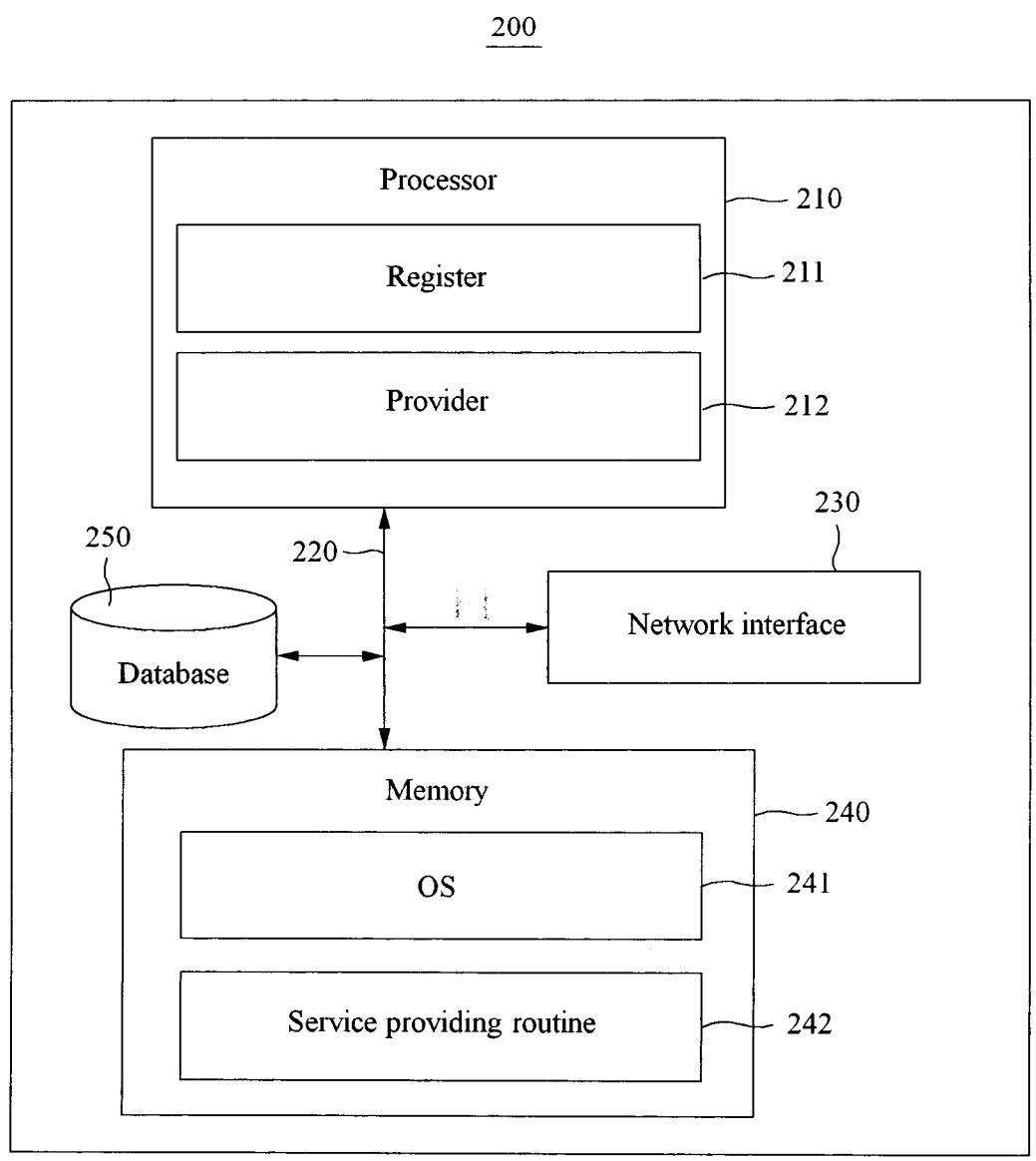
FIG. 2 is a block diagram illustrating a configuration of a content distribution system according to at least one example embodiment.

FIG. 2 is a block diagram illustrating a configuration of a content distribution system according to at least one example embodiment.

Referring to FIG. 2, a content distribution system 200 may include a processor 210, a bus 220, a network interface 230, a memory 240, and a database 250. The memory 240 may include an operating system (OS) 241 and a service providing routine 242. The processor 210 may include a register 211 and a provider 212. According to other example embodiments, the content distribution system 200 may include more number of components than the components shown in FIG. 2.

The memory 240 may include a permanent mass storage device, such as random access memory (RAM) and a disk drive, as a computer-readable recording medium. Also, a program code for the service providing routine 242 and the OS 241 may be stored on the memory 240. Such software components may be loaded from another computer-readable recording medium separate from the memory 240 using a drive mechanism (not shown). The other computer-readable recording medium may include, for example, a floppy drive, a disk, a tape, a DVD/CD-ROM drive, a memory card, and the like. According to other example embodiments, software components may be loaded to the memory 240 through the network interface 230 instead of using the computer-readable recording medium.

The bus 220 may enable communication and data transmission between components of the content distribution system 200. The bus 220 may be configured using a high-speed serial bus, a parallel bus, a storage area network (SAN) and/or another appropriate communication technique.

The network interface 230 may be a computer hardware component for connecting the content distribution system 200 to a computer network. The network interface 230 may connect the content distribution system 200 to the computer network through a wireless or wired connection.

The database 250 may serve to store and maintain a basic definition, for example, 72 to 120 DPI, image and a high-definition, for example, 300 DPI, original image for an online webtoon service with respect to each webtoon. Here, an image may be stored in the database 250 for each cut that is a scene unit of a webtoon. In the case of a high-definition original image, all the cuts of the webtoon may be registered to the database 250. Depending on cases, only a portion of cuts may be selectively registered among all the cuts. Although FIG. 2 illustrates that the database 250 is included inside the content distribution system 200, it is provided as an example only. The database 250 may be omitted based on a system configuration scheme or environment, and the like. Alternatively, the whole of a portion of the database may be present as an external database constructed on a separate system.

The processor 210 may be configured to process instructions of a computer program by performing basic arithmetic operations, logic operation, and input/output (I/O) operations of the content distribution system 200. The instructions may be provided from the memory 240 or the network interface 230 to the processor 210 through the bus 220. The processor 210 may be configured to execute a program code for the register 211 and the provider 212. The program code may be stored on a recording device such as the memory 240.

The register 211 and the provider 212 may be configured to perform a content distribution method, which is described hereinafter.

Figure 3:
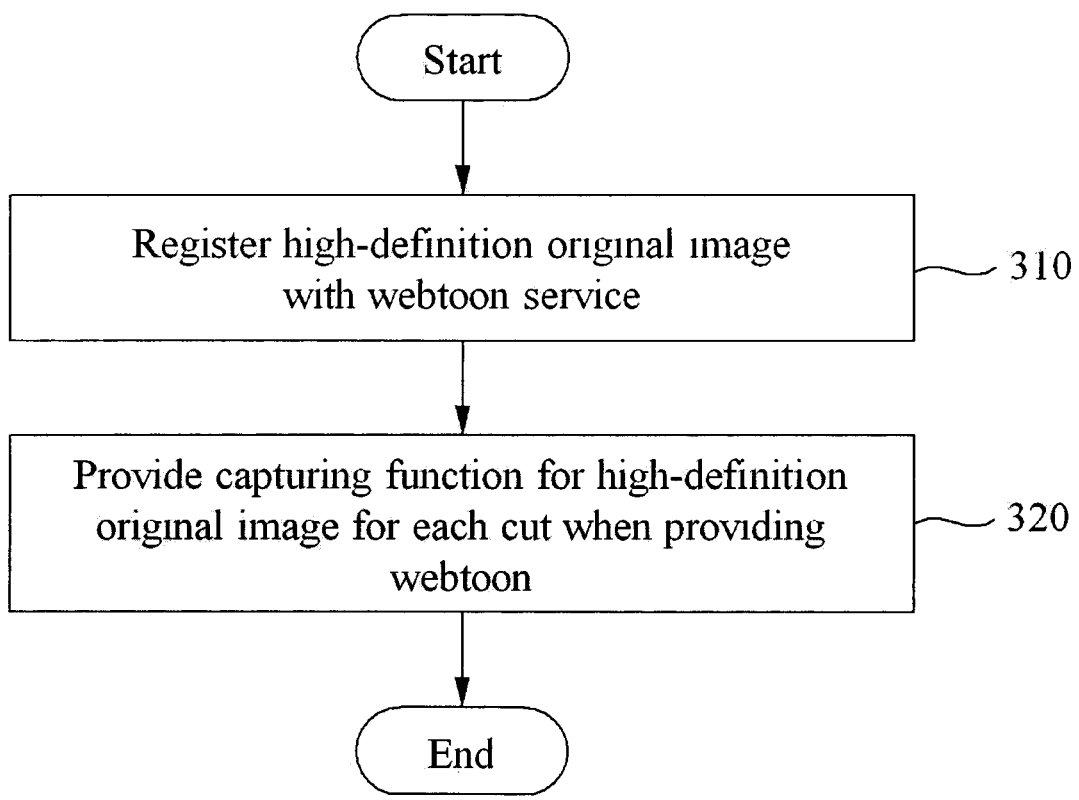
FIG. 3 is a flowchart illustrating a content distribution method according to at least one example embodiment.

FIG. 3 is a flowchart illustrating a content distribution method according to at least one example embodiment.

In operation 310, the register 211 may register a high-definition original image during a webtoon registration process. The register 211 may provide a webtoon creation tool to a writer and may register a manuscript input through the webtoon creation tool as a basic definition, for example, 72 to 120 DPI, for an online webtoon service. In particular, the register 211 may register the manuscript of the writer with the high-definition, for example, 300 DPI, original image. Here, the register 211 may register an image for each unit cut of the manuscript. In the case of the high-definition original image, the register 211 may register all of the cuts of the manuscript. Depending on cases, the register 211 may register only a cut selected by the writer from among the cuts.

In operation 320, in the case of servicing a specific webtoon to a user, the provider 212 may provide a capturing function for a high-definition original image for each unit cut of the specific webtoon. In the example embodiment, the capturing function provides a copy of a high-definition original image with respect to a partial image that the user likes or requires in the corresponding webtoon while viewing the webtoon. Further, the provider 212 may provide a sharing function of sharing the partial image of the webtoon, an editing function of editing the partial image of the webtoon, and a collection function of creating a collection using the partial image of the webtoon. Here, the editing function is a function of readily editing text lines of the webtoon, such as changing or translating a line area included in the partial image of the webtoon, and the collection function is a function of creating the best collection of the user only by combining partial images desired by the user using the webtoon service. The sharing function is a function of sharing the partial image for each unit cut of the webtoon. Content created using the capturing function, the editing function, and the collection function may be shared using a store (a content open market), a social network service (SNS), mail, a messenger, a message, a blog, a café, and the like. That is, the provider 212 may provide the capturing function, the sharing function, the editing function, and the collection function with respect to a partial image desired by the user excluding an unnecessary portion from the webtoon, instead of using the entire webtoon.

Figure 4:
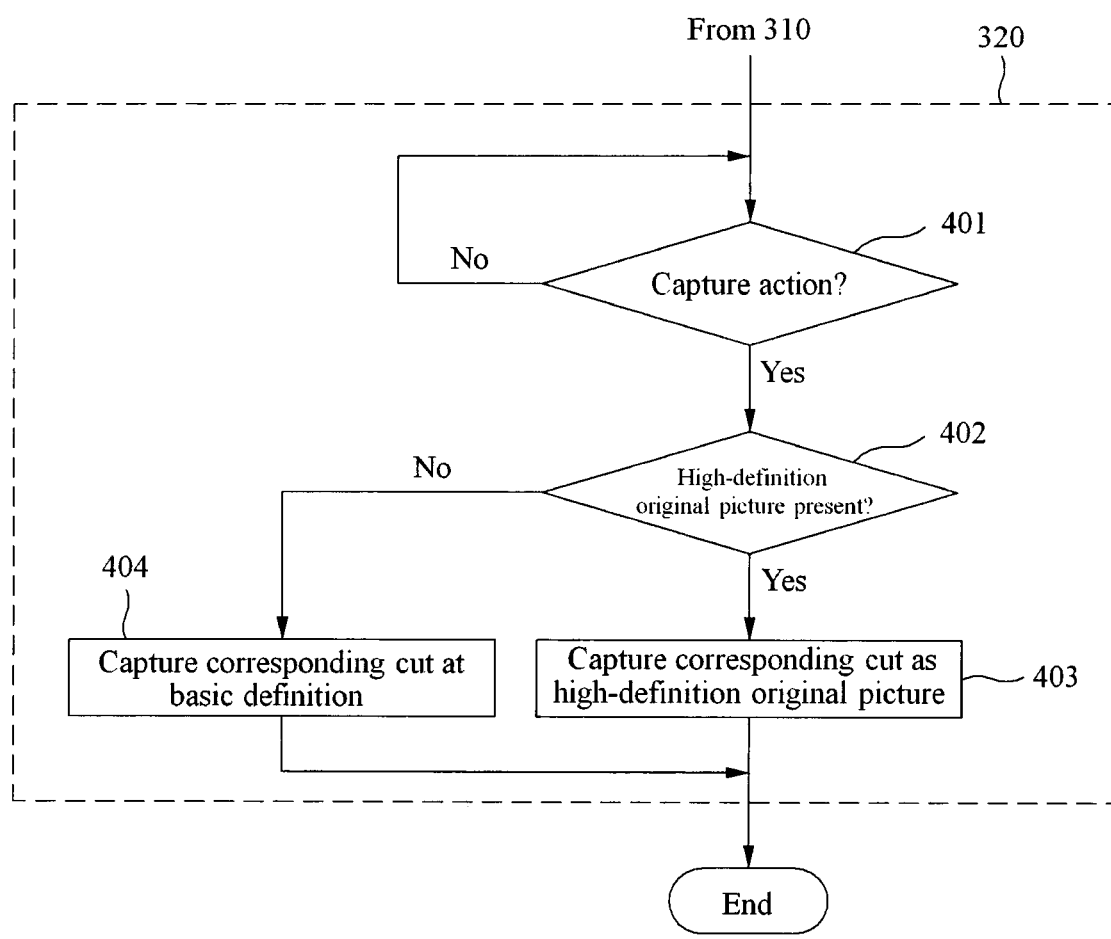
FIG. 4 is a flowchart illustrating a process of capturing a partial image of a webtoon according to at least one example embodiment.

FIG. 4 is a flowchart illustrating a process of capturing a partial image of a webtoon according to at least one example embodiment.

In operations 401 and 402, when a capture action for requesting capturing of a specific image of a webtoon is input from a user viewing the webtoon, the provider 212 determines whether a high-definition original image of the corresponding image is present. That is, the provider 212 determines whether the high-definition original image is registered in advance with respect to a cut specified by the user in the webtoon that the user is viewing.

In operations 402 and 403, when the high-definition original image is determined to be present with respect to the cut specified by the user, the provider 212 captures the corresponding cut as the high-definition original image. That is, when the user inputs the capture action at a scene that the user desires during viewing the webtoon, the provider 212 captures not the entire webtoon but the specific cut selected by the user as the high-definition original image.

In operations 402 and 404, when the high-definition original image is determined to be absent with respect to the cut specified by the user, the provider 212 captures the corresponding cut at a basic resolution for a webtoon service.

FIGS. 5 through 8 illustrate examples of a screen for describing a method of specifying a cut for capture according to at least one example embodiment.

Figure 5:
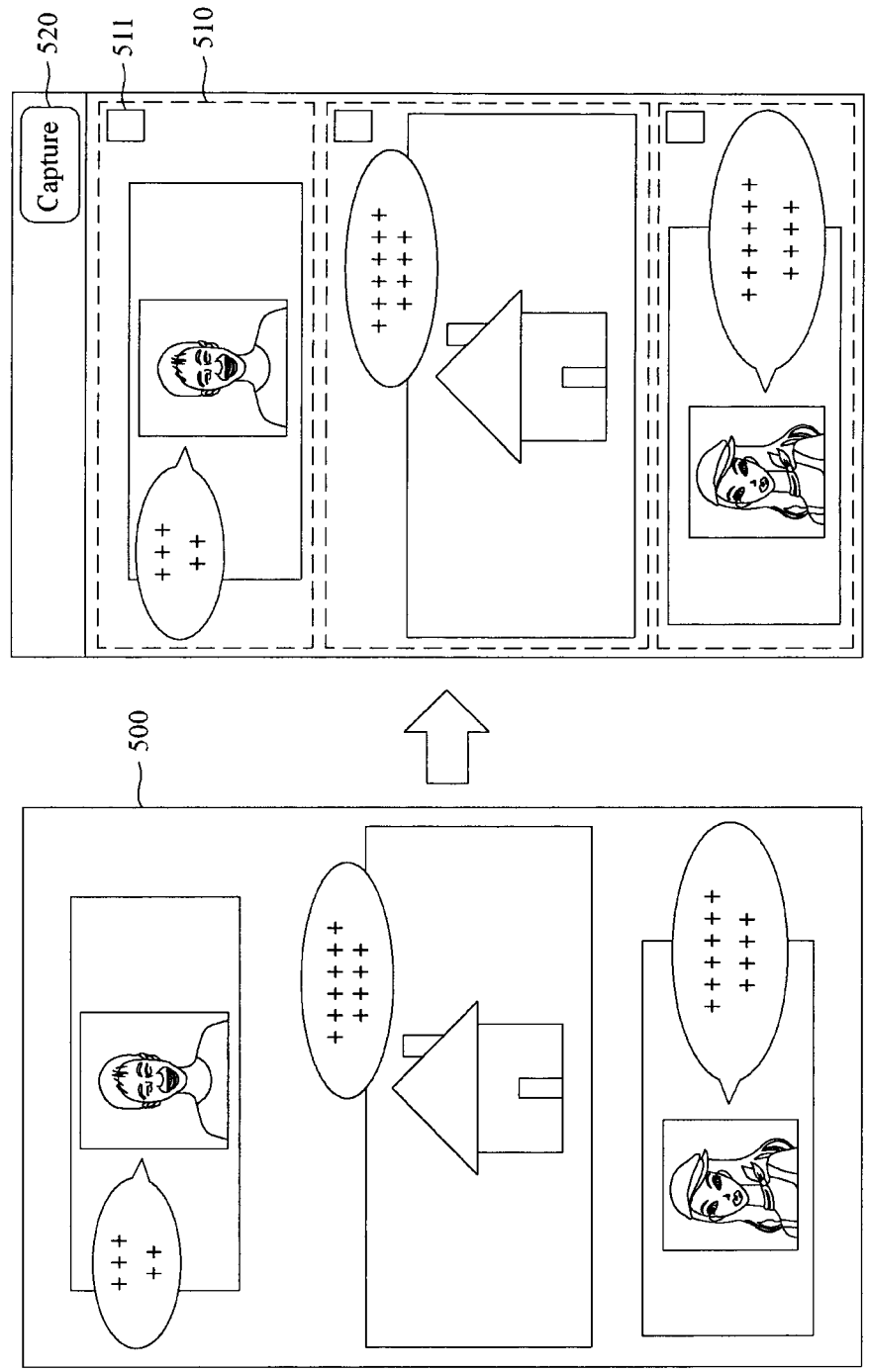
FIGS. 5 through 8 illustrate examples of a screen for describing a capturing function according to at least one example embodiment.

For example, referring to FIG. 5, in response to an input of a capture action, for example, a long touch, from a user on a webtoon screen 500 that services a webtoon requested by the user, the webtoon may be divided into unit cuts 510 and a selection input box 511 that allows a user selection may be displayed for each unit cut 510.

Accordingly, once the user selects at least one cut that the user desires to capture from the viewing webtoon through the selection input box 511 and inputs a 'capture' menu 520, the provider 212 may capture a high-definition original image of the selected cut. Here, if a high-definition original image is absent with respect to the cut selected by the user, the provider 212 may capture the selected cut as a basic original image that is registered for a webtoon service.

Figure 6:
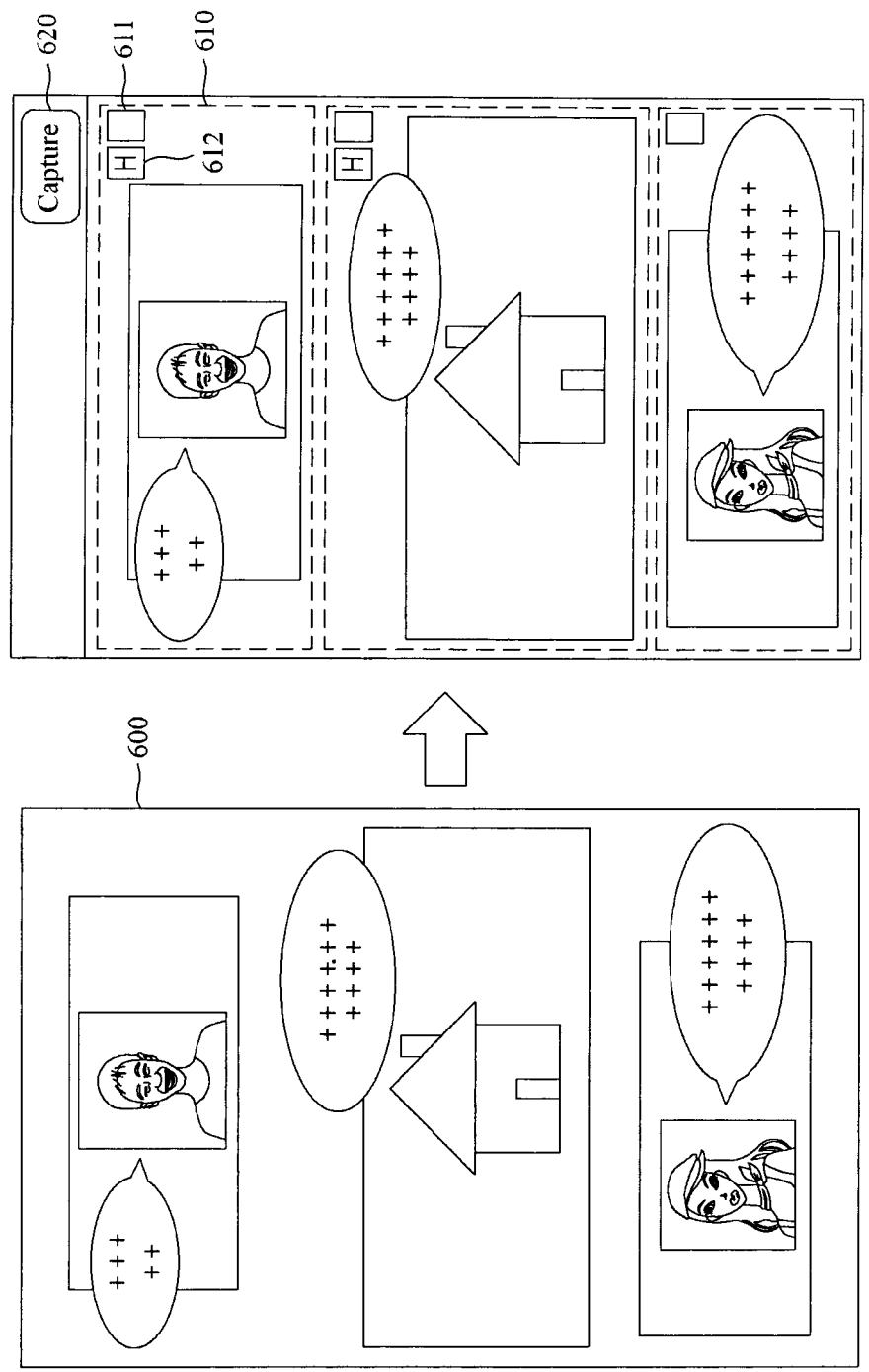

As another example, referring to FIG. 6, in response to an input of a capture action, for example, a long touch, from a user on a webtoon screen 600, the webtoon may be divided into unit cuts 610 and a selection input box 611 that allows a user selection may be displayed for each unit cut 610. Here, a high-definition original image indicator 612 indicating whether a high-definition original image of a corresponding cut is registered in advance may also be displayed for each unit cut 610.

The user may verify whether a high-definition original image is present through the high-definition original image indicator 612 for each unit cut 610. Once the user selects at least one cut through the selection input box 611 and inputs a 'capture' menu 620, the provider 212 may capture the cut selected by the user as a high-definition original image or a basic original image.

Figure 7:
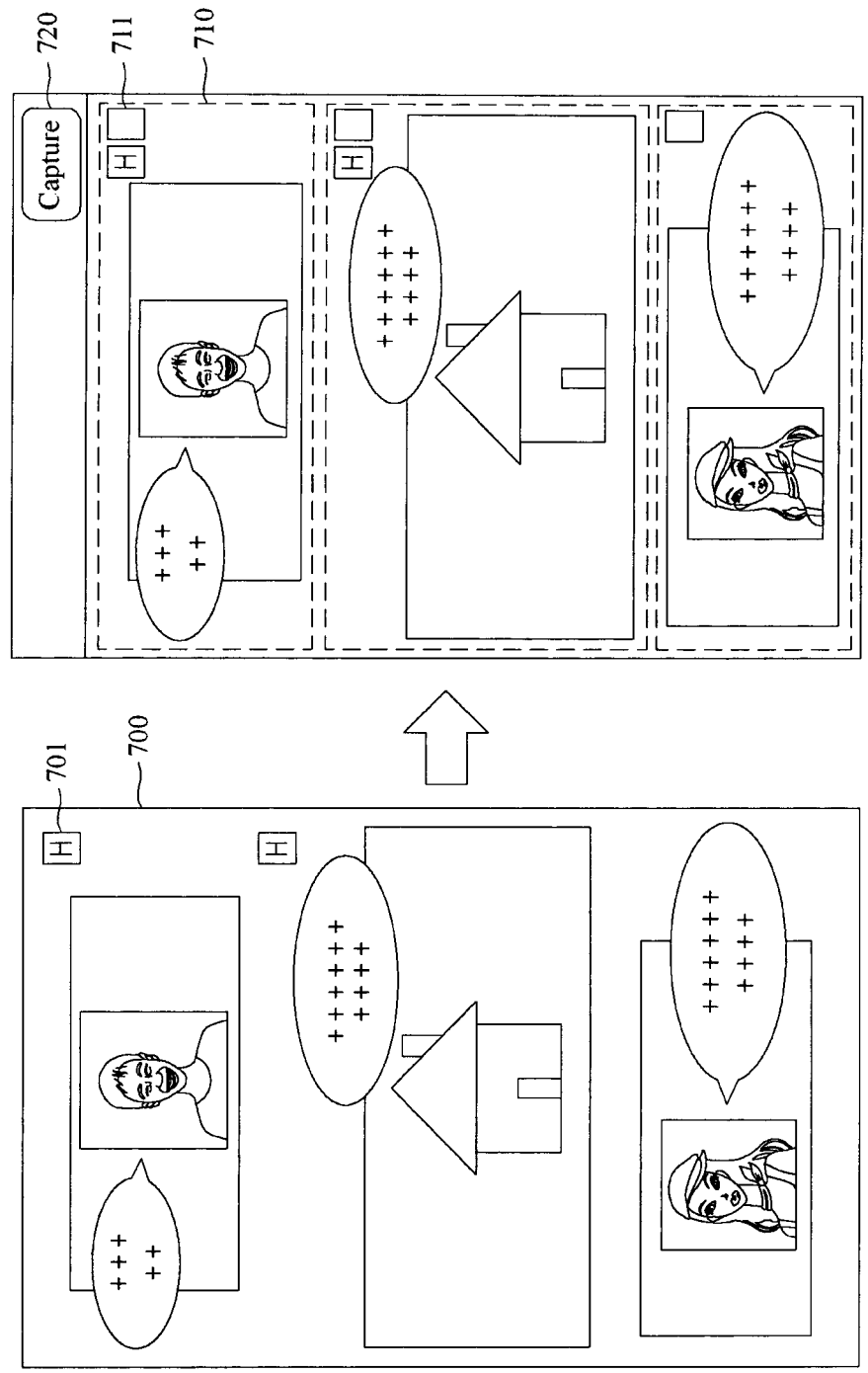

As another example, referring to FIG. 7, in the case of servicing a webtoon to a user, the provider 212 may display a high-definition original image indicator 701 indicating whether a high-definition original image is registered for each unit cut on a webtoon screen 700 on which the user is viewing the webtoon. Here, the user may recognize the high-definition original image indicator 701 while viewing the webtoon on the webtoon screen 700 and may verify a cut of which a high-definition original image is present.

In response to an input of a capture action, for example, a long touch, from the user on the webtoon screen 700, the webtoon may be divided into unit cuts 710 and a selection input box 711 that allows a user selection may be displayed for each unit cut 710.

Accordingly, once the user selects at least one cut that the user desires to capture from the viewing webtoon through the selection input box 711 and then inputs a 'capture' menu 720, the provider 212 may capture the cut selected by the user as a high-definition original image or a basic original image.

As another example, the provider 212 may display the high-definition original image indicator 701 as a capturing tool for each cut of which a high-definition original image is present. In response to a selection of the user on the high-definition original image indicator 701, the provider 212 may capture a high-definition original image of a corresponding cut immediately without a cut selection process.

Figure 8:
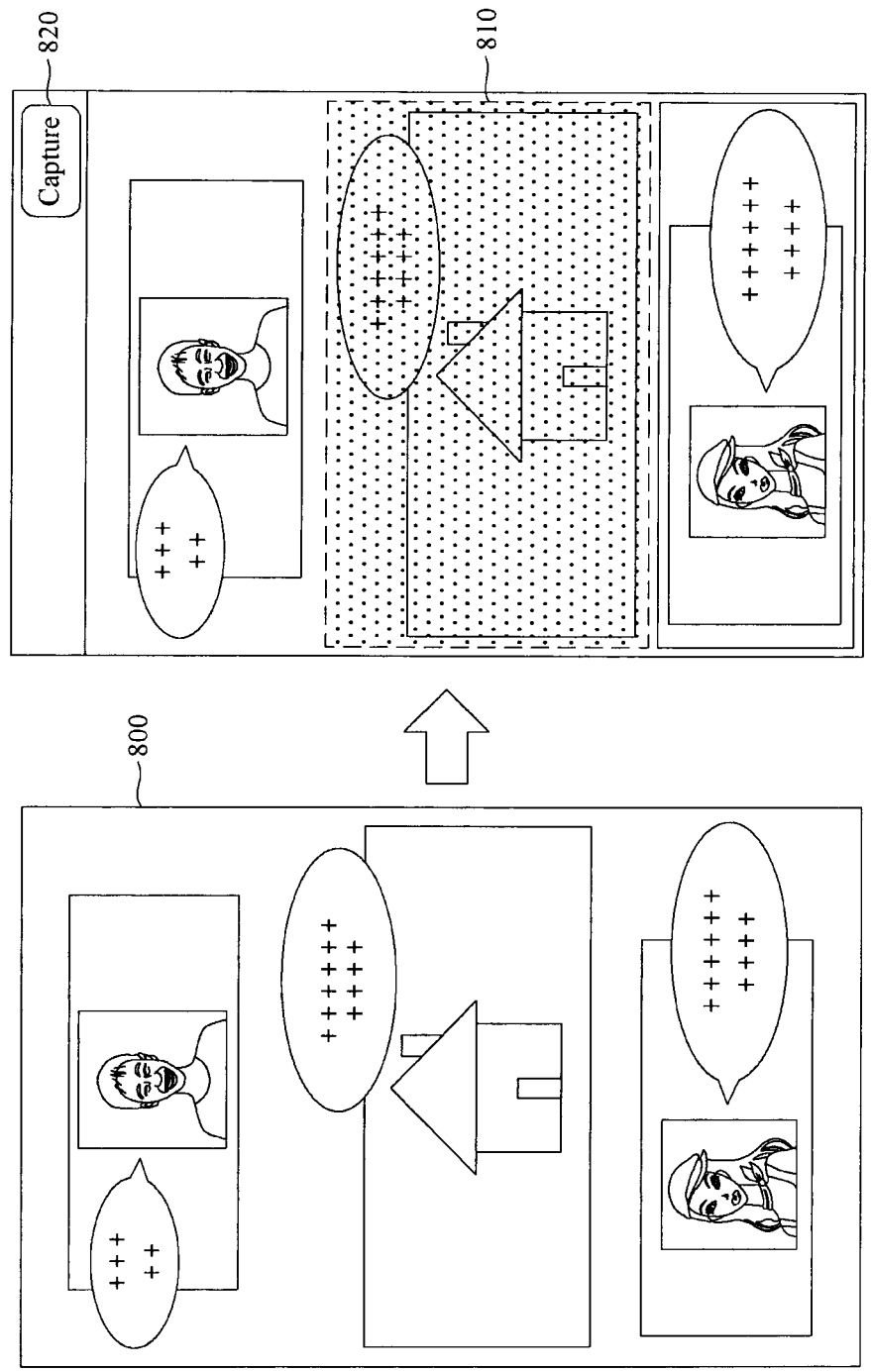

As another example, referring to FIG. 8, in response to an input of a capture action, for example, a long touch, from a user at a specific location of a webtoon screen 800, a unit cut 810 corresponding to or most adjacent to a location at which the capture action is input may be displayed to be distinguished from other cuts.

The user may perform a direct capture action on a scene preferred by the user while viewing the webtoon on the webtoon screen 800. Also, when the user verifies whether the specific cut 810 displayed to be distinguished from other cuts is the cut that the user desires to capture and inputs a 'capture' menu 820, the provider 212 may capture the cut selected by the user as a high-definition original image or a basic original image.

Figure 9:
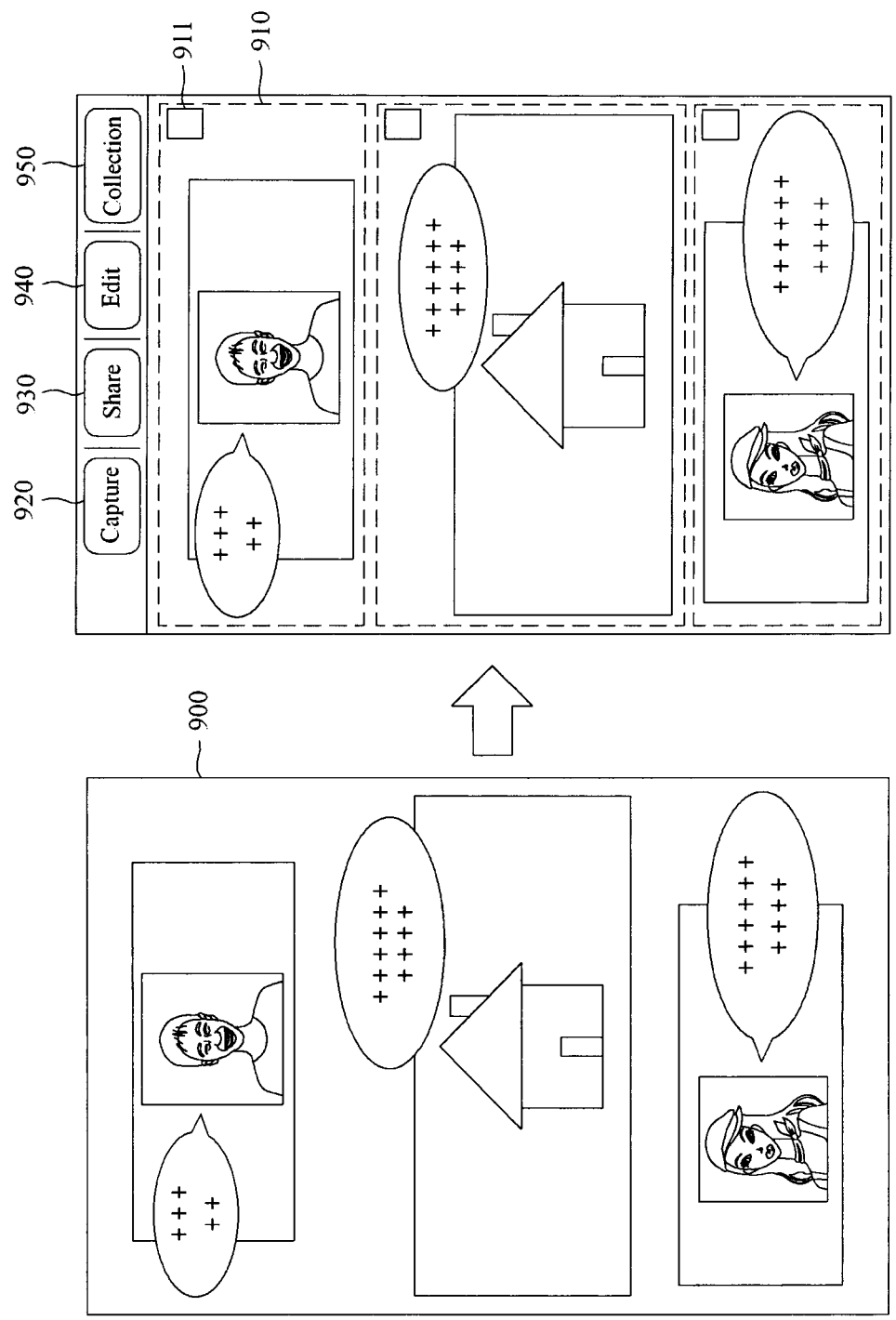
FIGS. 9 and 10 illustrate examples of an approach route to a sharing function, an editing function, and a collection function according to at least one example embodiment.
Figure 10:
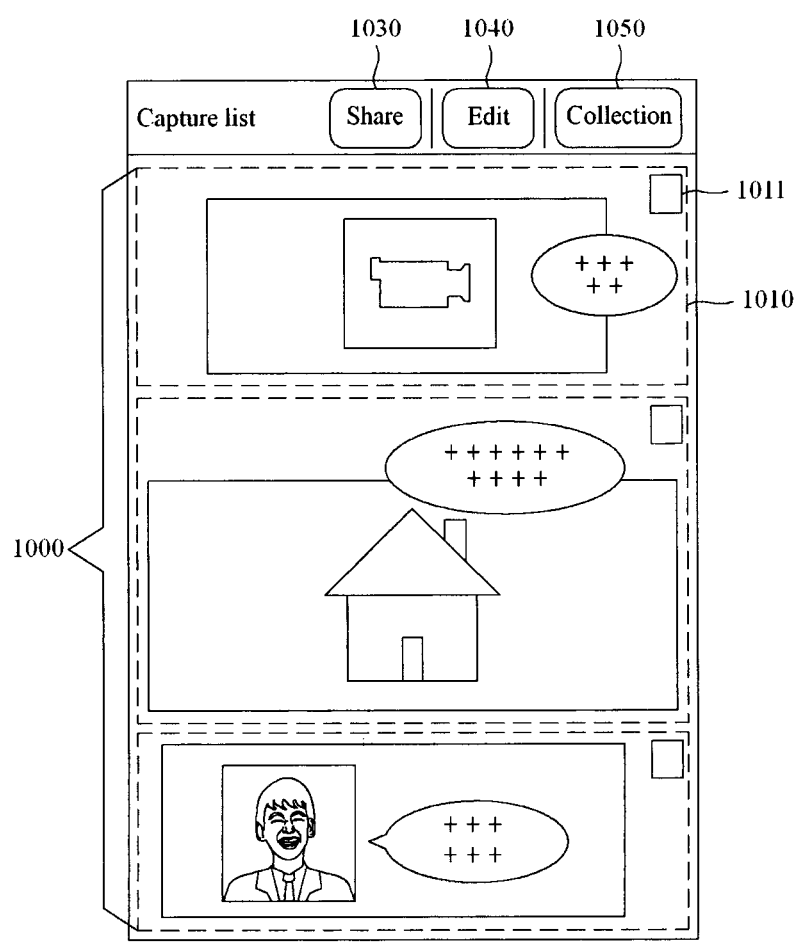

FIGS. 9 and 10 illustrate examples of an approach route to a sharing function, an editing function, and a collection function according to at least one example embodiment.

For example, referring to FIG. 9, in response to an input of a specific action, for example, a long touch, from a user on a webtoon screen 900 on which the user is viewing a webtoon, the webtoon may be divided into unit cuts 910 and a selection input box 911 that allows a user selection may be displayed for each unit cut 910. Here, a 'share' menu 930, an 'edit' menu 940, and a 'collection' menu 950 may be activated and displayed with a 'capture' menu 920 on a screen on which the unit cut 910 is distinguishably displayed. Accordingly, the provider 212 may provide a capturing function, a sharing function, an editing function, and a collection function available for each unit cut of a webtoon on a webtoon screen on which the user is viewing the webtoon.

As another example, referring to FIG. 10, the provider 212 may provide a capture list 1000 that is a list of images captured in response to a user selection. The capture list 1000 may be distinguishably displayed for each captured individual cut 1010, and a selection input box 1011 that allows a user selection may be displayed for each individual cut 1010. Here, a 'share' menu 1030, an 'edit' menu 1040, and a 'collection' menu 1050 may be activated and displayed on a screen on which the capture list 1000 is displayed. Accordingly, a list of images captured in response to the user selection may be separately managed. The provider 212 may provide a sharing function, an editing function, and a collection function available for each unit cut in a list of captured images.

In addition, the provider 212 may provide an image list including images each in which lines of an original image are edited by the user, and may also provide a 'share' menu and a 'collection' menu on a screen on which the image list is displayed. Accordingly, the image list in which the lines of the original image are edited by the user may be separately managed. The provider 212 may provide a sharing function and a collection function available for each unit cut in a list of edited images.

Also, the provider 212 may provide a collection list in which cuts selected by the user while viewing the webtoon are collected as a single piece of content and a list of images that constitute each collection, for each collection. The provider 212 may provide a 'share' menu and an 'edit' menu on a screen on which the collection list and the image list are displayed. Accordingly, the collection list created by the user by collecting cuts and the image list for each collection may be separately managed. The provider 212 may provide the sharing function and the editing function available for each collection or unit cut on the collection list or the image list for each collection.

As described above with reference to FIGS. 5 through 8, in the case of the capturing function, once the user selects at least one unit cut 910 through the selection input box 911 and inputs the 'capture' menu 920, the provider 212 may capture the cut selected by the user as a high-definition original image or a basic original image.

Figure 11:
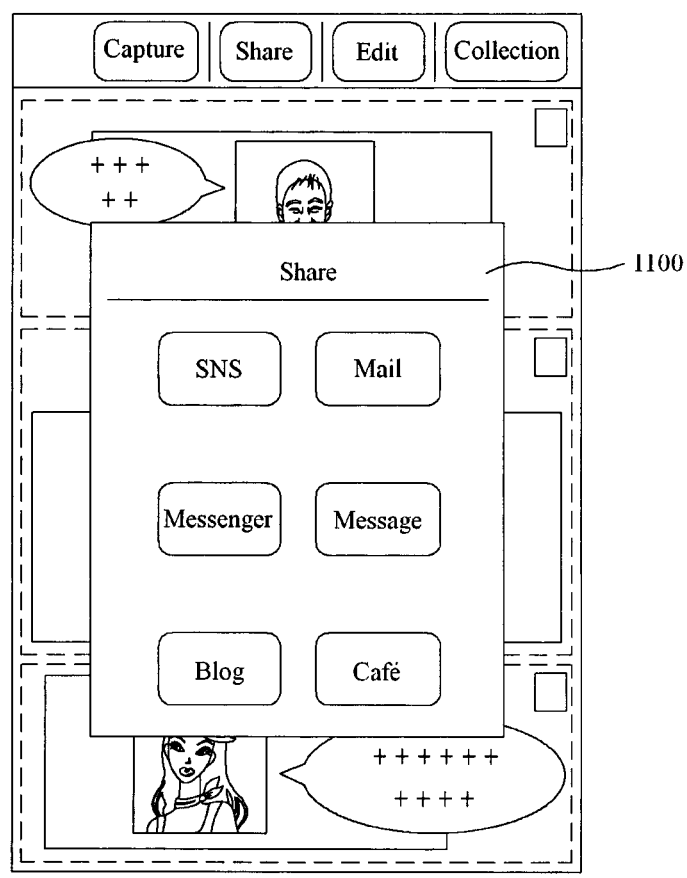
FIG. 11 illustrates an example of a screen for describing a sharing function according to at least one example embodiment.

Referring to FIG. 11, in the case of the sharing function, once the user selects at least one unit cut 910, 1010 through the selection input box 911, 1011 and inputs the 'share' menu 930, 1030, the provider 212 may provide a service list 1100 available to share the cut selected by the user. The service list 1100 may include menus for calling an SNS, a mail, a messenger, a message, a blog, a café, etc., which are services for sharing the cut selected by the user as a partial image of the webtoon with another user. To share a cut in which text lines of an original image are translated by the user, a menu for calling a translation participation service may be further included in the service list 1100. To share a collection created by the user, a menu for calling a store service that is a content open market may be further included in the service list 1100.

Figure 12:
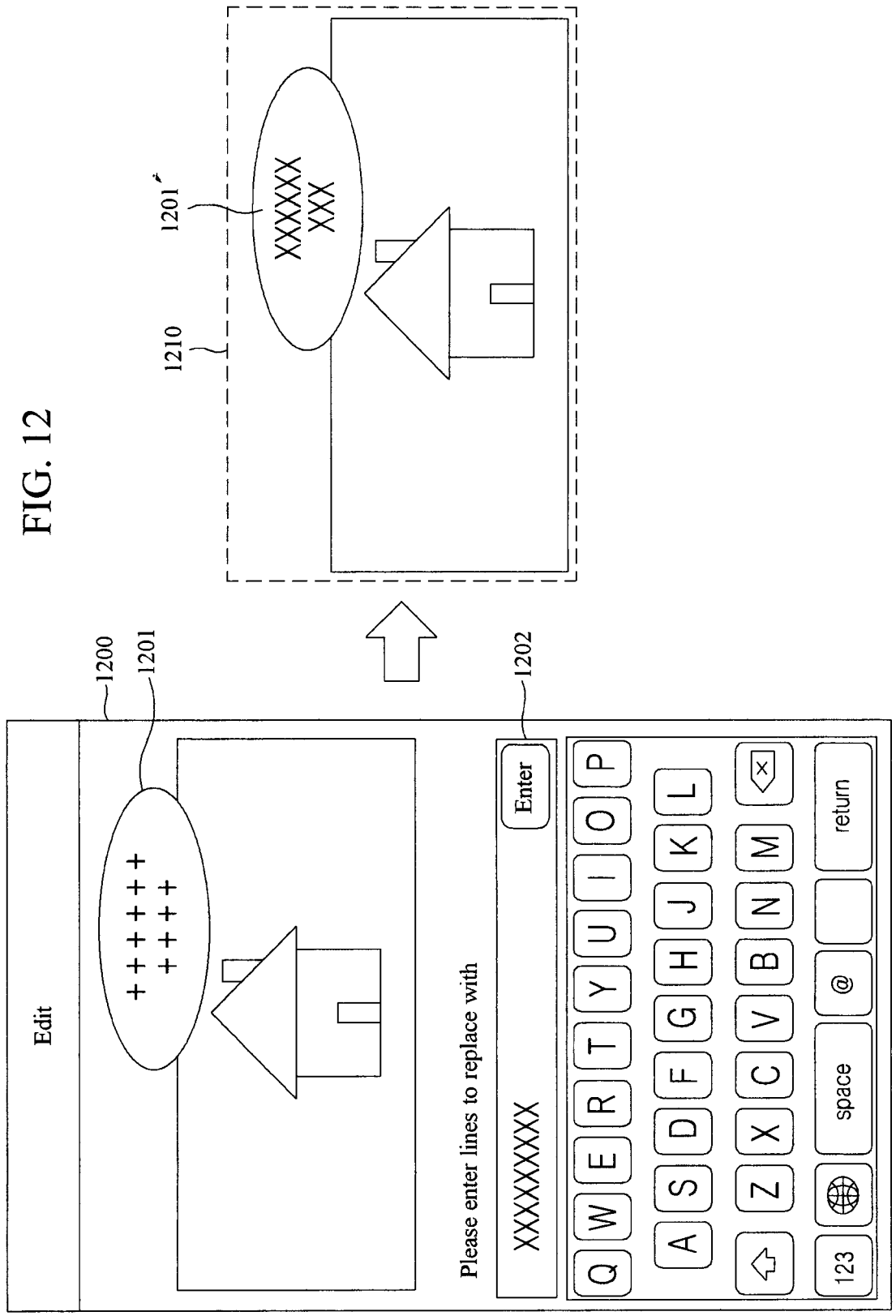
FIG. 12 is an example of a screen for describing an editing function according to at least one example embodiment.

Referring to FIG. 12, in the case of the editing function, once the user selects at least one unit cut 910, 1010 through the selection input box 911, 1011 and inputs the 'edit' menu 940, 1040, the provider 212 may provide an editing screen 1200 that allows a line editing of a corresponding cut. An input screen 1202 for receiving changed lines to replace lines 1201 of an original image may be included in the editing screen 1200. Here, the provider 212 may replace the lines 1201 of the original image with lines 1201' input through the input screen 1202 with respect to a specific cut 1210 selected by the user and may store the same. The provider 212 may collect lines (translated sentences) acquired by translating the lines 1201 of the original image using another language, from users that view the webtoon using a participating translation system. When servicing the corresponding webtoon, the provider 212 may replace the lines 1201 of the original image with a translated sentence selected based on a specific standard and may provide the replaced translated sentence or may provide at least one translated sentence through a separate subtitle and the like with respect to the lines 1201 of the original image.

Figure 13:
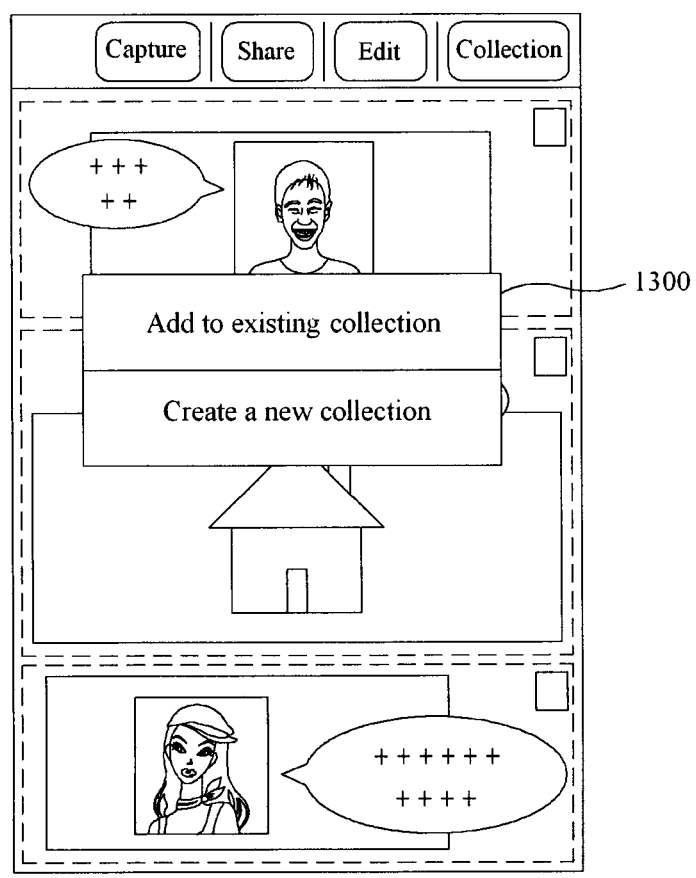
FIG. 13 illustrates an example of a screen for describing a collection function according to at least one example embodiment.

Referring to FIG. 13, in the case of the collection function, once the user selects at least one unit cut 910, 1010 through the selection input box 911, 1011 and inputs the 'collection' menu 950, 1050, the provider 212 may provide a menu list 1300 for creating a collection using a corresponding cut. The collection function may collect cuts selected by the user while viewing the webtoon and may create the collected cuts as a single piece of content. An 'add to existing collection' menu for adding a cut selected by the user to an existing collection and a 'create a new collection' menu for creating the cut selected by the user as a new collection may be included in the menu list 1300. The user may select an image based on a cut unit while viewing a webtoon or from various types of image lists, and may create a collection of the user alone. The user may share the created collection with other users using an SNS, a mail, a messenger, and the like, or may share the collection of the user through a content open market, for example, a bookstore, so that another user may purchase and view the collection created by the user.

According to example embodiments, instead of using an entire episode or an entire page of a webtoon, only a partial image desired by a user may be captured at a high definition based on a cut unit of the webtoon. Further, the partial image selected by the user may be shared or used to edit lines of an original image or create a collection based on the cut unit of the webtoon.

The aforementioned content distribution method may include reduced number of operations or additional operations based on the description made above with reference to FIGS. 1 through 13. Also, two or more operations may be combined and order or locations of the operations may be changed.

FIGS. 5 through 13 illustrate examples of some service screens to help understanding of the disclosure. The disclosure is not limited to the example embodiments, and a configuration, an order of such screen, and the like, may be modified.

Figure 14:
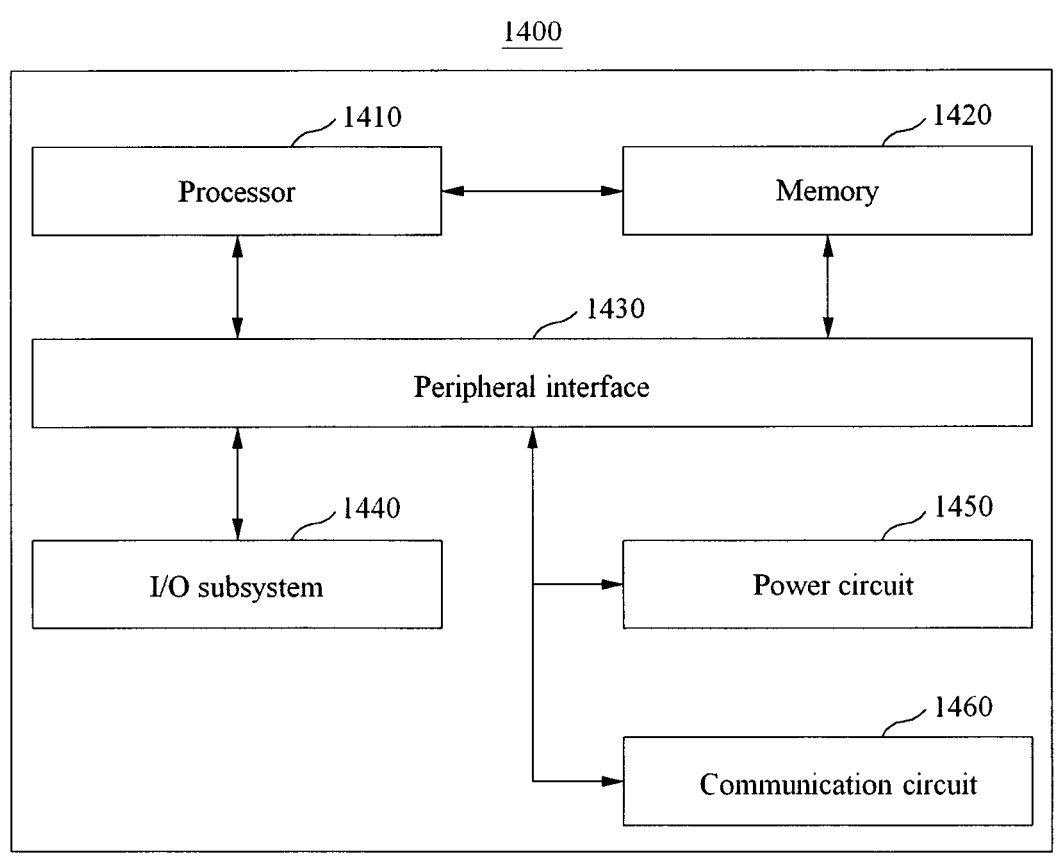
FIG. 14 is a block diagram illustrating an example of a configuration of a computer system according to at least one example embodiment.

FIG. 14 is a block diagram illustrating an example of a configuration of a computer system according to at least one example embodiment.

Referring to FIG. 14, a computer system 1400 may include at least one processor 1410, a memory 1420, a peripheral interface 1430, an I/O subsystem 1440, a power circuit 1450, and a communication circuit 1460. Here, the computer system 1400 may correspond to the user terminal 101.

The memory 1420 may include, for example, a high-speed random access memory (HSRAM), a magnetic disk, a static random access memory (SRAM), a dynamic RAM (DRAM), ROM, a flash memory, or a non-volatile memory. The memory 1420 may include a software module, an instruction set, or a variety of data required for an operation of the computer system 1400. Here, an access from another component, such as the processor 1410 and the peripheral interface 1430, to the memory 1420 may be controlled by the processor 1410.

The peripheral interface 1430 may couple an input device and/or an output device of the computer system 1400 with the processor 1410 and the memory 1420. The processor 1410 may perform a variety of functions for the computer system 1400 and may process data by executing the software module or the instruction set stored on the memory 1420.

The I/O subsystem 1440 may couple various I/O peripheral devices with the peripheral interface 1430. For example, the I/O subsystem 1440 may include a controller for coupling a peripheral device, such as a monitor, a keyboard, a mouse, a printer, and a touch screen or a sensor, etc., if necessary, with the peripheral interface 1430. According to another aspect, the I/O peripheral devices may be coupled with the peripheral interface 1430 without using the I/O subsystem 1440.

The power circuit 1450 may supply power to all of or a portion of components of a terminal. For example, the power circuit 1450 may include a power management system, at least one power source such as a battery and alternating circuit (AC), a charge system, a power failure detection circuit, a power converter or inverter, a power status indicator, or other components for creating, managing and distributing the power.

The communication circuit 1460 may enable communication with another computer system using at least one external port. Alternatively, as described above, the communication circuit 1460 may enable communication with another computer system by including a radio frequency (RF) circuit and thereby transmitting and receiving an RF signal known as an electromagnetic signal.

The example embodiment of FIG. 14 is only an example of the computer system 1400. The computer system 1400 may have a configuration or an arrangement for omitting a portion of the components illustrated in FIG. 14, further including components not illustrated in FIG. 14, or coupling two or more components. For example, a computer system for a communication terminal of a mobile environment may further include a touch screen, a sensor, and the like, in addition to the components of FIG. 14. A circuit for RF communication using a variety of communication methods, for example, wireless fidelity (WiFi), 3rd generation (3G), long term evolution (LTE), Bluetooth, near field communication (NFC), ZigBee, etc., may be included in the communication circuit 1460. Components includable in the computer system 1400 may be configured as hardware that includes an integrated circuit specified for at least one signal processing or application, software, or a combination of hardware and software.

The methods according to the example embodiments may be configured in a form of a program instruction executable through a variety of computer systems and may be recorded on a non-transitory computer-readable medium. In particular, a program according to the example embodiments may be configured as a PC-based program or an application exclusive for a mobile terminal. An application to which the example embodiments are applicable may be installed on the user terminal through a file that is provided from a file distribution system. For example, the file distribution system may include a file transmitter (not shown) configured to transmit the file in response to a request from the user terminal.

According to some example embodiments, since a high-definition original image is constructed in a database with respect to cartoon content and a partial image of the cartoon content is provided at a high definition, a user may capture a required image at the high definition and may own or share the captured high-definition image. According to example embodiments, it is possible to readily distribute only a portion desired by a user, instead of distributing an entire episode or an entire page of cartoon content, by selecting and distributing a partial image from the cartoon content. According to example embodiments, it is possible to readily create and distribute content by providing an environment capable of creating the best collection using a partial image of cartoon content or by changing and sharing a line area of the cartoon content.

The apparatuses described herein may be implemented using hardware components, software components, and/or a combination thereof. For example, the apparatuses and the components described herein may be implemented using a processing device, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

Program instructions for executing the methods according to the above-described example embodiments may be recorded in non-transitory computer-readable media to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A content distribution method executed by at least one computer for distributing cartoon content having a plurality of unit scenes with a basic definition original image and at least one unit scene having a high-definition original image, the method comprising:
    registering the cartoon content including a high-definition original image for at least one unit scene among all unit scenes of the cartoon content;
    displaying the plurality of unit scenes of the cartoon content together on a display screen;
    visibly dividing the plurality of unit scenes displayed on the display screen into a predetermined plurality of unit cuts and displaying the plurality of unit cuts together on the display screen in response to an input of a user action on the display screen for capturing at least one of the plurality of unit scenes; and
    capturing a high-definition original image of a unit scene selected by a user from the plurality of unit cuts of the cartoon content displayed on the display screen,
    wherein each of the plurality of unit cuts is a drawing created by the creator of the cartoon content and corresponds to one of the plurality of unit scenes.

2. The method of claim 1, wherein the high-definition original image has a high resolution compared to the basic definition original image at which an online service provides the cartoon content.

3. The method of claim 1, wherein the capturing comprises providing, on the display screen, a selection function for each unit scene of the divided unit cuts of the cartoon content and capturing the high-definition original image of the unit scene selected through the selection function.

4. The method of claim 1, wherein the capturing comprises determining from the display screen whether the high-definition original image is registered for the selected unit scene, and capturing the corresponding high-definition original image in response to the high-definition original image being determined to be registered and capturing the a basic definition original image of the cartoon content in response to the high-definition original image being determined not to be registered.

5. The method of claim 1, wherein the capturing comprises displaying, on the display screen, a separate indicator or a capturing tool on a unit cut corresponding to a unit scene of which the high-definition original image is registered in the cartoon content.

6. The method of claim 1, further comprising:
    sharing the captured high-definition original image with another user by enabling the another user to have access to the captured high-definition original image.

7. The method of claim 1, further comprising:
    providing, on the display screen, a selection function for each unit cut of the cartoon content and providing, on the display screen, a sharing function for sharing a unit scene selected through the selection function with another user.

8. The method of claim 1, further comprising:
    providing, on the display screen, a selection function for each unit cut of the cartoon content and providing, on the display screen, an editing function for editing a unit scene selected through the selection function.

9. The method of claim 8, wherein the editing function comprises a function of changing or translating lines included in the unit scene.

10. The method of claim 1, further comprising:
    providing, on the display screen, a selection function for each unit cut of the cartoon content and providing, on the display screen, a collection function of creating a unit scene selected through the selection function as a collection.

11. A non-transitory computer-readable recording medium storing an instruction to cause a computer system to control distribution of cartoon content having a plurality of unit scenes with a basic definition original image and at least one unit scene having a high-definition original image, wherein the instruction controls the computer system execute the steps comprising:
    registering the cartoon content including a high-definition original image for at least one unit scene among all unit scenes of the cartoon content; displaying a plurality of select unit scenes of the cartoon content together on a display screen;
    visibly dividing the plurality of unit scenes displayed on the display screen into a predetermined plurality of unit cuts and displaying the plurality of unit cuts together on the display screen in response to an input of a user action on the display screen for capturing at least one of the plurality of unit scenes; and
    capturing a high-definition original image of a unit scene selected by a user from the plurality of unit cuts of the cartoon content displayed on the display screen,
    wherein each of the plurality of unit cuts is a drawing created by the creator of the cartoon content and corresponds to one of the plurality of unit scenes.

12. A content distribution system implemented in at least one computer for distributing cartoon content having a plurality of unit scenes with a basic definition original image and at least one unit scene having a high-definition original image, comprising:
    a register configured to register the cartoon content including a high-definition original image for at least one unit scene among all unit scenes of the cartoon content; and
    a provider configured to display the plurality of unit scenes of the cartoon content together on a display screen, visibly dividing the plurality of unit scenes displayed on the display screen into a predetermined plurality of unit cuts and display the plurality of unit cuts together on the display screen in response to an input of a user action on the display screen for capturing at least one of the plurality of select unit scenes, and provide, on the display screen displaying the cartoon content, a capturing function for a high-definition original image of a unit scene selected by a user from the plurality of unit cuts of the cartoon content displayed on the display screen,
    wherein each of the plurality of unit cuts is a drawing created by the creator of the cartoon content and corresponds to one of the plurality of unit scenes.

13. The content distribution system of claim 12, wherein the high-definition original image having a high resolution compared to the basic definition original image at which an online service provides the cartoon content.

14. The content distribution system of claim 12, wherein the provider is configured to provide, on the display screen, a selection function for each unit scene of the divided unit cuts of the cartoon content and to capture the high-definition original image of the unit scene selected through the selection function.

15. The content distribution system of claim 12, wherein the provider is configured to display, on the display screen, a separate indicator or a capturing tool on a unit cut corresponding to a unit scene of which the high-definition original image is registered in the cartoon content.

16. The content distribution system of claim 12, wherein the provider is configured to provide, on the display screen, a selection function for each unit cut of the cartoon content and to provide, on the display screen, a sharing function of sharing a unit scene selected through the selection function.

17. The content distribution system of claim 12, wherein the provider is configured to provide, on the display screen, a selection function for each unit cut of the cartoon content and to provide, on the display screen, an editing function for editing a unit scene selected through the selection function.

18. The content distribution system of claim 12, wherein the provider is configured to provide, on the display screen, a selection function for each unit cut of the cartoon content and to provide, on the display screen, a collection function of creating a unit scene selected through the selection function as a collection.

\* \* \* \* \*